（12） United States Patent
Kitamura et al.

(10) Patent No.: US 8,720,229 B2
(45) Date of Patent: May 13, 2014

(54) VACUUM DEGASSING APPARATUS, APPARATUS FOR PRODUCING GLASS PRODUCTS AND PROCESS FOR PRODUCING GLASS PRODUCTS

(75) Inventors: Rei Kitamura, Tokyo (JP); Hironobu Yamamichi, Tokyo (JP); Hiroaki Hamamoto, Tokyo (JP); Hajime Itoh, Tokyo (JP); Housaku Yonetsu, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 152 days.

(21) Appl. No.: 12/895,930

(22) Filed: Oct. 1, 2010

(65) Prior Publication Data

US 2011/0016922 A1  Jan. 27, 2011

Related U.S. Application Data

(63) Continuation of application No. PCT/JP2009/060009, filed on Jun. 1, 2009.

(30) Foreign Application Priority Data

Jun. 2, 2008  (JP) .................................. 2008-144519

(51) Int. Cl.
C03B 5/225  (2006.01)
(52) U.S. Cl.
USPC ........................................... 65/134.2; 65/346
(58) Field of Classification Search
USPC .......... 65/134.1, 134.2, 134.9, 126, 129, 336, 65/339, 346
See application file for complete search history.

(56) References Cited

U.S. PATENT DOCUMENTS 3,042,510 A * 7/1962 Armbruster et al. ............ 75/511
3,367,396 A * 2/1968 Stich et al. ..................... 164/474
(Continued)

FOREIGN PATENT DOCUMENTS

DE  200 22 727 U1  4/2002
(Continued)

OTHER PUBLICATIONS

The Extended European Search Report isssued Jun. 9, 2011, in Application No. / Patent No. 09758295.1-1218 / 2272806 PCT/JP2009060009.

*Primary Examiner* — Matthew Daniels
*Assistant Examiner* — Lisa Herring
(74) *Attorney, Agent, or Firm* — Oblon, Spivak, McClelland, Maier & Neustadt, L.L.P.

(57) ABSTRACT

A vacuum degassing apparatus having a throughput of at least 200 tons/day without causing problems such as a stagnation of molten glass flow in the molten glass flow path, an increment of flow rate of the molten glass flow in a local area, an excessive increment of pressure loss of the molten glass flow. A vacuum degassing apparatus comprises a vacuum degassing vessel, and an uprising pipe and a downfalling pipe which are connected with the vacuum degassing vessel, wherein the vacuum degassing vessel includes a wide portion for providing a molten glass flow path, and in the wide portion, the proportion $W_1/L_1$ of the breadth of molten glass flow path $W_1$ to the length of molten glass flow path $L_1$ is at least 0.2 and that in the vacuum degassing vessel, the breadth of molten glass flow path $W_2$ of the portion connected with the uprising pipe and the breadth of molten glass flow path $W_3$ of the portion connected with the downfalling pipe are narrower than the breadth of molten glass flow path $W_1$ in the wide portion, and the position of the bottom of molten glass flow path of the portion connected with the uprising pipe and the position of the bottom of molten glass flow path of the portion connected with the downfalling pipe are lower than the position of the bottom of molten glass flow path of the wide portion.

21 Claims, 4 Drawing Sheets

(56) References Cited

U.S. PATENT DOCUMENTS

| | | | |
|---|---|---|---|
| 4,110,098 A * | 8/1978 | Mattmuller | 65/141 |
| 6,401,492 B1 * | 6/2002 | Nattermann | 65/347 |
| 7,007,514 B2 | 3/2006 | Sakai et al. | |
| 7,650,764 B2 | 1/2010 | Sakai et al. | |
| 2002/0033030 A1 * | 3/2002 | Kawaguchi et al. | 65/134.2 |
| 2003/0066315 A1 * | 4/2003 | Sakai et al. | 65/157 |
| 2005/0160769 A1 * | 7/2005 | Sakai et al. | 65/346 |
| 2007/0266737 A1 * | 11/2007 | Rodek et al. | 65/346 |
| 2007/0270300 A1 * | 11/2007 | Kurachi et al. | 501/56 |

FOREIGN PATENT DOCUMENTS

| | | |
|---|---|---|
| DE | 201 22 083 U1 | 4/2004 |
| EP | 1 655 268 A2 | 5/2006 |
| EP | 1 655 268 A3 | 5/2006 |
| JP | 05263123 A * | 10/1993 |
| JP | 2000-178029 | 6/2000 |
| JP | 2003-104730 | 4/2003 |

* cited by examiner

VACUUM DEGASSING APPARATUS, APPARATUS FOR PRODUCING GLASS PRODUCTS AND PROCESS FOR PRODUCING GLASS PRODUCTS

TECHNICAL FIELD

The present invention relates to a vacuum degassing apparatus, an apparatus for producing glass products and a process for producing glass products.

BACKGROUND ART

A vacuum degassing apparatus has conventionally been employed to remove bubbles generated in molten glass prior to shaping the molten glass in a shaping apparatus, the molten glass being produced by melting glass materials in a melting tank, so that the quality of shaped glass products can be improved.

The vacuum degassing apparatus comprises a vacuum degassing vessel the interior of which is maintained in a predetermined vacuum level. When the molten glass is passed through the vacuum degassing vessel, bubbles contained in the molten glass grow in a relatively short time. The grown bubbles rise in the molten glass owing to their buoyancy. When they reach the surface of the molten glass, they break themselves whereby the bubbles can be removed effectively from the surface of the molten glass.

From the viewpoints of increasing the amount of glass to be produced, reducing cost for producing glass etc., there has been a requirement for a large-sized equipment for producing glass, and also, for the vacuum degassing apparatus, there has been a requirement for increasing the ability of degassing, i.e. increasing the flow rate of the molten glass in the apparatus.

In order to increase the flow rate of the molten glass and to obtain a prescribed vacuum degassing treatment, it is necessary to consider fluctuations in various factors (for example, there are a fluctuation of the flow rate of the molten glass flow to which a degassing treatment is conducted, a fluctuation of the concentration of a gas component dissolved in the molten glass, which is caused by a temperature decrease of molten glass in the melting furnace, a fluctuation of the pressure in the depressurized vacuum degassing vessel, etc.) Under the consideration of these factors, it is necessary to bring the liquid surface of the molten glass into contact widely with an upper space in the vacuum degassing vessel whereby the bubbles generated in the molten glass can be removed to a prescribed range by degassing. In order to bring the liquid surface of the molten glass into contact widely with the upper space, the area of the bottom of the vacuum degassing vessel should be increased.

The area of the bottom of the vacuum degassing vessel can be increased by elongating the molten glass flow path in a longitudinal direction of the vacuum degassing vessel or by increasing the breadth of molten glass flow path. However, in a conventional vacuum degassing vessel having a long molten glass flow path, if the molten glass flow path is further elongated in its longitudinal direction, the thermal expansion in a longitudinal direction of the material for the flow path further increases whereby the flow path may be broken and the service life of the apparatus would be shortened. Further, such measures make the flow path longer as a whole, and therefore, the size of the apparatus whose vacuum degassing vessel be maintained in a predetermined degree of vacuum, is also increased. Accordingly, it is preferable to increase the breadth of molten glass flow path rather than the elongation of the molten glass flow path in its longitudinal direction. The inventors of the present application have proposed that the breadth of molten glass flow path is increased to increase the capacity of the apparatus, in Patent Document 1.

Patent Document 1 mentions the following two points as problems caused when the breadth of molten glass flow path of a vacuum degassing vessel is increased evenly.

First, it is anticipated that there takes place a molten glass flow of low flow rate in a local area at a downstream side of the molten glass flow path. In such case, the molten glass flow of low flow rate stays in that area longer than the molten glass flowing in the other area whereby light elements such as sodium (Na) evaporate during the stagnation so that the formulation of the molten glass in the local area may change. As a result, a final product such as a sheet-like glass has a local area having a different refractive index, which creates a distorted perspective image, whereby the ream deteriorates and the quality decreases.

Second, since it is difficult to produce a monolithic dense fire resistant brick which does not require any joint in a direction of the breadth of molten glass flow path e.g., a dense fire resistant brick having a breadth of 1 m, it is necessary to fabricate a molten glass flow path by assembling some dense fire resistant bricks in its breadth direction. Accordingly, it is unavoidable that joints exist in the ceiling, the bottom and both side walls which constitute the flow path in the vacuum degassing vessel. It is anticipated that among the above-mentioned joints, the joints at the connecting portions between the ceiling and the both side walls, and between the bottom and the both side walls spread easily owing to the thermal expansion of the fire resistant bricks when they are preheated for use or are heated for use. When the joints spread once, they are eroded severely by the molten glass and many bubbles generate from the spread joints, and these bubbles remain in the molten glass. Since these bubbles do not grow enough to be removed by degassing, the molten glass contains a large number of bubbles together with fine sand particles and is discharged from the vacuum degassing vessel. Thus, there is a problem of deterioration of the quality of glass products.

Patent Document 1 proposes the vacuum degassing apparatus to solve the above-mentioned first problem. The vacuum degassing apparatus for molten glass comprises a vacuum housing whose interior is vacuumed by air-sucking, a vacuum degassing vessel provided in the vacuum housing to degas the molten glass passing therethrough, an uprising pipe communicated with the vacuum degassing vessel to raise the molten glass by sucking before the degassing so as to introduce it into the vacuum degassing vessel and a downfalling pipe communicated with the vacuum degassing vessel to discharge downward the degassed molten glass from the vacuum degassing vessel, wherein the vacuum degassing vessel is so constituted that the inner breadth of flow path in a downstream portion in which the degassed molten glass falls through the downfalling pipe is narrower than the inner breadth of flow path in an upstream portion in which the molten glass is introduced through the uprising pipe.

Further, to solve the above-mentioned second problem, proposed is a vacuum degassing apparatus for molten glass which comprises a vacuum housing whose interior is vacuumed by air-sucking, a vacuum degassing vessel which is constituted by assembling some dense fire resistant bricks in the vacuum housing to degas the molten glass passing therethrough, an uprising pipe communicated with the vacuum degassing vessel to raise the molten glass by sucking before degassing so as to introduce it into the vacuum degassing vessel and a downfalling pipe communicated with the vacuum degassing vessel to discharge downward the degassed molten glass from the vacuum degassing vessel, wherein the vacuum degassing vessel comprises a ceiling, a bottom and both side walls which provide a flow path of rectangular shape in cross section by assembling some dense fire resistant bricks. The dense fire resistant bricks constituting the ceiling and the bottom which are connected with the both side walls have notched portions to which the dense fire resistant bricks of the both side walls fit. A fixing means is provided at the outside of the both side walls of the vacuum degassing vessel to fix the dense fire resistant bricks of the both side walls from the outside.

CITATION LIST

Patent Document

Patent Document 1: JP-A-2000-178029

SUMMARY OF INVENTION

Technical Problem

The vacuum degassing apparatus described in Patent Document 1 is so constructed that the inner breadth of flow path in a downstream portion in the vacuum degassing vessel from which the molten glass falls in the downfalling pipe is made narrower than the inner breadth of flow path in an upstream portion in which the molten glass is introduced through the uprising pipe, so that a reduction of flow rate of the molten glass flow in a local area in a downstream portion of the molten glass flow path can be prevented, namely, the stagnation of the molten glass flow can be prevented. However, as is clear in FIG. 2 of Patent Document 1, the stagnation of the molten glass flow occurs because the diameter of the downfalling pipe is smaller than the molten glass flow path of the vacuum degassing vessel having an increased breadth. Accordingly, from the standpoint of eliminating the stagnation of the molten glass flow, it is preferable that the inner breadth of flow path in an upstream portion in which the molten path is introduced from the uprising pipe, be also narrowed. Namely, in the molten glass flow path of the vacuum degassing vessel, it is preferable that the inner breadth of flow path in an upstream portion in which the molten glass is introduced from the uprising pipe and the inner breadth of flow path in a downstream portion in which the molten glass falls in the downfalling pipe be narrower than the other portion of molten glass flow path, namely, the inner breadth of an intermediate portion of the molten glass flow path.

However, if the inner breadth of molten glass flow path is made narrower locally, the flow rate of the molten glass flow flowing in that portion will increase. The inventors of the present application have found that when the vacuum degassing apparatus having a throughput of about 20 tons/days as described in the paragraph (0039) of Patent Document 1 is employed, the molten glass flow tends to take a simply linear course, and in such a case, an increment of flow rate of the molten glass flow in a local area does not create a problem. However, in a case of a large-sized vacuum degassing apparatus having a throughput of 200 tons/days or more, an increment of flow rate of the molten glass flow in a local area becomes problematic.

The present invention has been made based on such finding.

When a large-sized vacuum degassing apparatus is fabricated, a dense fire resistant material, in particular, fused refractory is employed as the constituent material for the vacuum degassing vessel, as described in Patent Document 1. Such material has excellent fire resistant properties, durability to molten glass etc., i.e. it is excellent as the constituent material for the vacuum degassing vessel. However, in the vacuum degassing vessel, the portion in contact with molten glass is eroded by the molten glass during the operation of the vacuum degassing apparatus. In the vacuum degassing apparatus having a throughput of about 20 tons/days as described in the paragraph (0039) of Patent Document 1, even though there was a local area where the flow rate of molten glass flow increases, there was no problem of erosion by the molten glass. However, the inventors have found that in a large-sized vacuum degassing apparatus having a throughput of 200 tons/days or more, corrosion by molten glass in a local area where the flow rate of molten glass increases cannot be neglected.

Further, when the inner breadth of molten glass flow path is made narrow locally, there is a possibility that the pressure loss (the rheological resistance) of the molten glass flow passing through the vacuum degassing vessel increases. When the flow path of the conventional vacuum degassing vessel having a large length is further elongated in its longitudinal direction, a pressure loss (a rheological resistance) caused when molten glass passes through the molten glass flow path becomes a problem, although this point is not described in Patent Document 1. Further, the inventors have found that in the vacuum degassing apparatus having a throughput of about 20 tons/days as described in the paragraph (0039) of Patent Document 1, there is little problem as to an increment of pressure loss of the molten glass flow passing through the vacuum degassing vessel, however, in a case of a large-sized vacuum degassing apparatus having a throughput of 200 tons/days or more, an excessive increment of pressure loss of the molten glass flow takes place when the inner breadth of molten glass flow path is made narrow, whereby there causes a serious problem in the vacuum degassing apparatus.

The present invention is to provide a vacuum degassing apparatus capable of realizing a throughput of 200 tons/days or more without causing the stagnation of molten glass flow in the molten glass flow path, an increment of flow rate of the molten glass flow in a local area and other problems such as an excessive increment of pressure loss of the molten glass flow, whereby the problems which have newly been found with respect to the above-mentioned conventional techniques can be solved.

Solution to Problem

In order to achieve the above-mentioned objects, the present invention is to provide a vacuum degassing apparatus comprising a vacuum degassing vessel, and an uprising pipe and a downfalling pipe which are connected with the vacuum degassing vessel, the vacuum degassing apparatus being characterized in that the vacuum degassing vessel includes a wide portion for providing a molten glass flow path, and in the wide portion, the proportion $W_1/L_1$ of the breadth of molten glass flow path $W_1$ to the length of molten glass flow path $L_1$ is at least 0.2 and that in the vacuum degassing vessel, the breadth of molten glass flow path $W_2$ in the portion connected with the uprising pipe and the breadth of molten glass flow path $W_3$ in the portion connected with the downfalling pipe are narrower than the breadth of molten glass flow path $W_1$ in the wide portion, and the position of the bottom of molten glass flow path in the portion connected with the uprising pipe and the position of the bottom of molten glass flow path in the portion connected with the downfalling pipe are lower than the position of the bottom of molten glass flow path of the wide portion.

In the vacuum degassing apparatus of the above-mentioned invention, it is preferable that the breadth of molten glass flow path $W_1$ in the wide portion is at least 1,000 mm.

In the vacuum degassing apparatus of the above-mentioned invention, it is preferable that the length of molten glass flow path $L_1$ in the wide portion is at least 5,000 mm.

In the vacuum degassing apparatus of the above-mentioned invention, it is preferable that the position of the bottom of molten glass flow path in the portion connected with the uprising pipe and the position of the bottom of molten glass flow path in the portion connected with the downfalling pipe are respectively 50 to 1,000 mm lower than the position of the bottom of molten glass flow path in the wide portion.

In the vacuum degassing apparatus of the above-mentioned invention, it is preferable that the breadth of molten glass flow path $W_2$ in the portion connected with the uprising pipe, the breadth of molten glass flow path $W_3$ in the portion connected with the downfalling pipe, the inner diameter (the diameter) $r_2$ of the uprising pipe and the inner diameter (the diameter) $r_3$ of the downfalling pipe satisfy the relations as indicated in the following formulas:

$$1 \times r_2 \leq W_2 \leq 5 \times r_2 \text{ and}$$

$$1 \times r_3 \leq W_3 \leq 5 \times r_3$$

In the vacuum degassing apparatus of the above-mentioned invention, it is preferable that considering a horizontal plane for the liquid plane of molten glass as standard, the cross-sectional area of molten glass flow path $S_1$ of the wide portion under the horizontal plane, the cross-sectional area of molten glass flow path $S_2$ in the portion connected with the uprising pipe under the horizontal plane and the cross-sectional area of molten glass flow path $S_3$ in the portion connected with the downfalling pipe under the horizontal plane satisfy the relations as indicated in the following formulas:

$$1.0 \leq S_1/S_2 \leq 10.0 \text{ and}$$

$$1.0 \leq S_1/S_3 \leq 10.0$$

In the vacuum degassing apparatus of the above-mentioned invention, it is preferable that the breadth of molten glass flow path $W_1$ (mm) in the wide portion, the length of molten glass flow path $L_1$ (mm) in the wide portion, the length of molten glass flow path $L_2$ (mm) in the portion connected with the uprising pipe and the length of molten glass flow path $L_3$ (mm) in the portion connected with the downfalling pipe satisfy the relations as indicated in the following formulas:

$$0.5 \times W_1 \leq L_2 \leq 2 \times L_1 \text{ and}$$

$$0.5 \times W_1 \leq L_3 \leq 2 \times L_1$$

The present invention is to provide an apparatus for producing glass products, which comprises a vacuum degassing apparatus as described above, a melting means provided at a upstream side of the vacuum degassing apparatus to melt glass materials into molten glass, a shaping means provided at a downstream side of the vacuum degassing apparatus to shape the molten glass and an annealing means for annealing a shaped glass product.

The present invention is to provide a process for producing glass products, which comprises a step of degassing molten glass by a vacuum degassing apparatus as described above, a melting step of melting glass materials at an upstream side of the vacuum degassing apparatus to produce molten glass, a shaping step of shaping the molten glass at a downstream side of the vacuum degassing apparatus and an annealing step of annealing a shaped glass product.

The present invention is to provide a process for producing glass products including a melting step of melting glass materials to produce molten glass, a step of degassing the molten glass by a vacuum degassing apparatus having a vacuum degassing vessel, and an uprising pipe and a downfalling pipe which are connected with the vacuum degassing vessel, a shaping step of shaping the molten glass after the degassing treatment and an annealing step of annealing a shaped glass product, the process for producing glass products being characterized in that the molten glass flowing in the vacuum degassing vessel has a wide portion wherein the proportion $w_1/l_1$ of the breadth of molten glass flow $w_1$ to the length of molten glass flow $l_1$ is at least 0.2 and that the breadth of molten glass flow $w_2$ in the portion connected with the uprising pipe, and the breadth of molten glass flow $w_3$ in the portion connected with the downfalling pipe are narrower than the breadth of molten glass flow $w_1$ in the wide portion and the depth of molten glass flow $h_2$ in the portion connected with the uprising pipe, and the depth of molten glass flow $h_3$ in the portion connected with the downfalling pipe are deeper than the depth of molten glass flow $h_1$ in the wide portion.

Advantageous Effects of Invention

According to the present invention, it is possible to provide a vacuum degassing apparatus capable of achieving a throughput of 200 tons/days or more without causing problems such as the stagnation of molten glass flow in the molten glass flow path, an increment of flow rate of the molten glass flow in a local area and an excessive increment of pressure loss of the molten glass flow.

DESCRIPTION OF EMBODIMENTS

Figure 1:
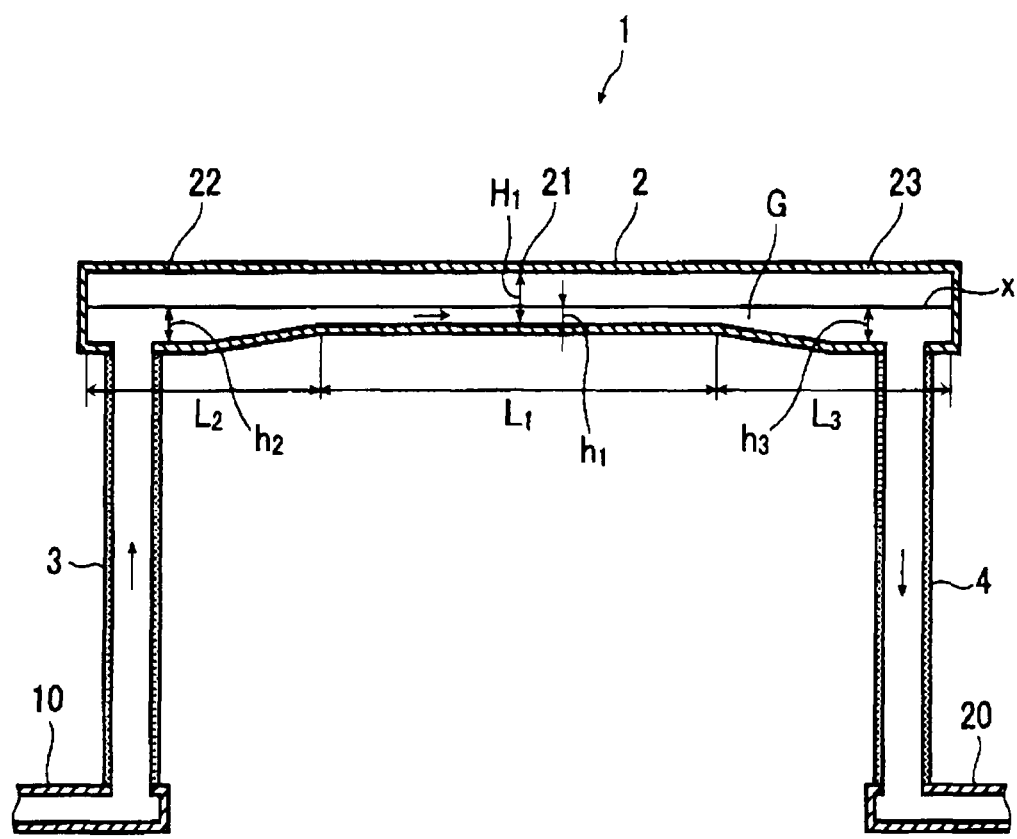
FIG. 1 is a cross-sectional view showing an embodiment of a vacuum degassing apparatus of the present invention.

In the following, the present invention will be described with reference to drawings. FIG. 1 is a cross-sectional view showing an embodiment of the vacuum degassing apparatus of the present invention. The vacuum degassing apparatus 1 shown in FIG. 1 is employed for a process that molten glass supplied from a melting tank (not shown) is degassed, and the degassed molten glass is supplied continuously to the next processing apparatuses (a shaping apparatus, an annealing apparatus subsequent thereto etc., although these are not shown).

The vacuum degassing apparatus 1 has a vacuum degassing vessel 2 in which a flow path of molten glass G is formed. The molten glass G is passed through the vacuum degassing vessel 2 whose interior is maintained in a vacuumed state of less than the atmospheric pressure, during which the molten glass is degassed. In FIG. 1, the horizontal line x in the vacuum degassing vessel 2 indicates the liquid plane of the molten glass G, and it indicates a horizontal plane as the liquid plane of molten glass in the vacuum degassing vessel 2.

The vacuum degassing vessel 2 is usually contained in a vacuum housing (not shown). By sucking air in the vacuum housing to depressurize it, the inner pressure of the vacuum degassing vessel is rendered to be a depressurized state of less than the atmospheric pressure. On the other hand, in a case that the vacuum degassing vessel 2 is not contained in a vacuum housing, air in the upper space above the molten glass G in the vacuum degassing vessel 2 is sucked with use of a vacuum pump or the like whereby the inner pressure of the vacuum degassing vessel 2 is maintained to be a depressurized state of less than the atmospheric pressure.

The vacuum degassing vessel 2 is connected with an uprising pipe 3 and a downfalling pipe 4. The uprising pipe 3 is a feeding means for the molten glass G, which raises the molten glass G before degassing by a sucking action to introduce it into the vacuum degassing vessel 2, and its lower end portion is connected to an upstream-side conduit structure 10. The downfalling pipe 4 is a feeding means for the molten glass G, which discharges the degassed molten glass G by feeding it down from the vacuum degassing vessel 2, and its lower end portion is connected to a downstream-side conduit structure 20.

Figure 2:
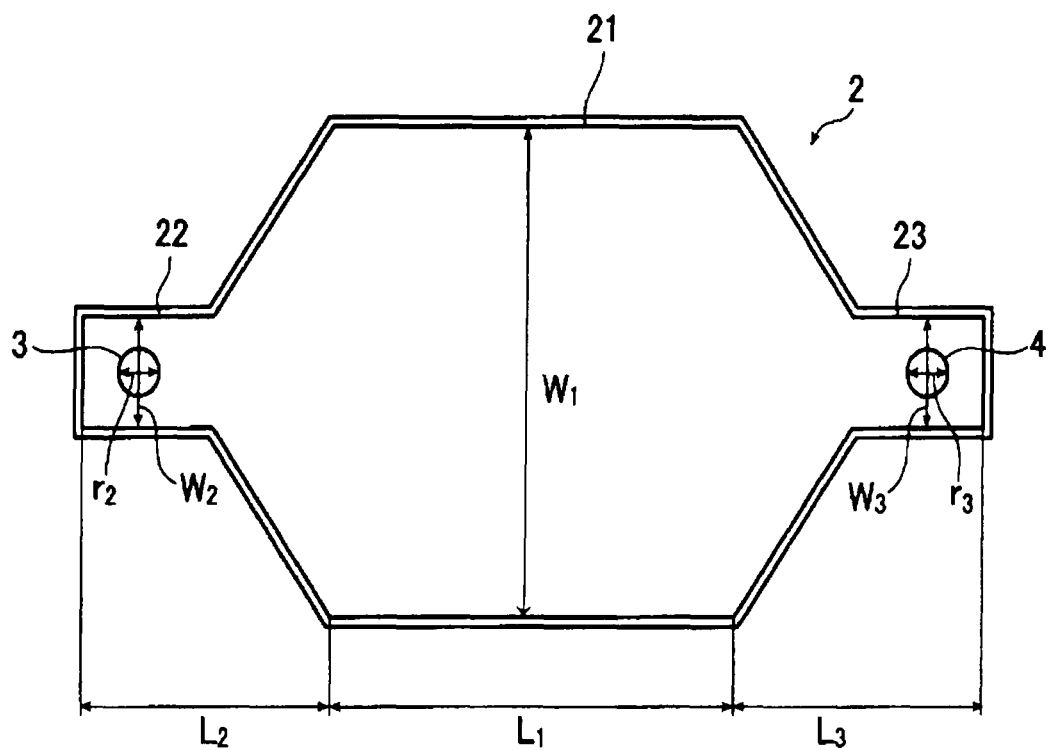
FIG. 2 is a plan view of a vacuum degassing vessel 2 shown in FIG. 1 provided that an upper wall of the vacuum degassing vessel 2 is omitted so that the inner structure of the vacuum degassing vessel 2 can be seen.

FIG. 2 is a plan view of the vacuum degassing vessel 2 shown in FIG. 1 wherein an upper wall, the vacuum housing and so on are omitted so that the inner structure of the vacuum degassing vessel 2 can be seen.

In the present invention, the vacuum degassing vessel 2 has a wide portion 21 so that the vacuum degassing apparatus achieves a throughput of 200 tons/day or more. The wide portion 21 provides a flow path for the molten glass G in the vacuum degassing vessel 2. In this description, the wide portion in the vacuum degassing vessel indicates a portion of molten glass flow path which has a larger breadth than the other portion in the vacuum degassing vessel.

In the vacuum degassing apparatus 1 of the present invention, the proportion ($W_1/L_1$) of the breadth of flow path $W_1$ for molten glass G to the length $L_1$ in the wide portion 21 is at least 0.2. When $W_1/L_1$ of the wide portion 21 is at least 0.2, a throughput of 200 tons/day or more can be attained without causing such problems as a breakage of the molten glass flow path owing to the thermal expansion in a longitudinal direction, an excessive increment of pressure loss of the molten glass flow and so on. Further, by setting up $W_1/L_1$ in the wide portion 21 to be at least 0.2, the dimensions of the vacuum degassing apparatus can be minimized in spite of its having a large scale of throughput of 200 tons/day or more.

$W_1/L_1$ is preferably at least 0.25, more preferably at least 0.3, further preferably at least 0.35. Further, generally, $W_1/L_1$ is preferably at most 4, more preferably at most 2.5, further preferably at most 1.3.

It is preferable that the breadth of molten glass flow path $W_1$ of the wide portion 21 is at least 1,000 mm in order to attain the throughput of 200 tons/day or more. It is more preferable that $W_1$ is at least 2,000 mm and is further preferable that $W_1$ is at least 3,000 mm.

The length of molten glass flow path $L_1$ of the wide portion 21 is, therefore, preferably at least 5,000 mm in order to attain the throughput of 200 tons/day or more. It is more preferable that $L_1$ is at least 6,000 mm, and further preferably, $L_1$ is at least 7,000 mm.

It is preferable that the upper limit of $W_1$ is 10,000 mm and the upper limit of $L_1$ is 15,000 mm in terms of workability.

The ceiling covering the flow path of molten glass G in the vacuum degassing vessel 2 is flat or in an arch-like shape in a direction of breadth with respect to the molten glass flow. In either case, it is preferable that the largest height $H_1$ from the bottom to the ceiling of the wide portion 21 is from 500 to 5,000 mm. In case that the ceiling covering the flow path of molten glass G in the vacuum degassing vessel is flat, it is preferable that the height $H_1$ from the bottom to the ceiling of the wide portion 21 is from 500 to 5,000 mm. When the depth from the horizontal plane considered to be the liquid plane of molten glass to the bottom of the wide portion 21 is expressed by $h_1$, the height from the horizontal plane to the ceiling takes a value obtained by subtracting $h_1$ from $H_1$.

If $H_1$ is less than 500 mm, it may be difficult to adjust $h_1$ to be an appropriate depth or a degassing efficiency may decrease because of a narrow degassing space. On the other hand, if $H_1$ exceeds 5,000 mm, it may be difficult to fabricate the vacuum degassing vessel. It is more preferable that $H_1$ is 500 to 2,000 mm, further preferably 700 to 1,500 mm.

The depth $h_1$ from the horizontal plane considered to be the liquid plane of molten glass to the bottom of the wide portion 21 (which equals the depth of molten glass flow in the wide portion 21 when the molten glass G flows in the vacuum degassing vessel 2) is preferably from 100 to 1,000 mm. The value $h_1$ is substantially free from the value of $H_1$ as long as $h_1 < H_1$ and a certain degree of vacuumed space is assured.

If the value $h_1$ is less than 100 mm, the bottom of molten glass flow path of the wide portion 21 may be eroded by the molten glass, or there may arise a question of the pressure loss caused when the molten glass passes through the wide portion 21. On the other hand, if the value $h_1$ exceeds 1,000 mm, the ascending of the bubbles existing around the bottom of molten glass flow path is hindered to thereby decrease the effect of degassing.

It is more preferable that $h_1$ is 200 to 900 mm, and further preferably 300 to 800 mm. It is particularly preferable that it is 400 to 700 mm. The height ($H_1 - h_1$) from the horizontal plane to the ceiling, which means the height of the degassing space, is preferably at least 100 mm, more preferably at least 200 mm.

The uprising pipe 3 is connected to the vacuum degassing vessel 2 at an upstream side of the wide portion 21 and the downfalling 4 is connected to the vacuum degassing vessel at a downstream side of the wide portion 21. In the following, the portion of vacuum degassing vessel 2 connected with the uprising pipe 3 is referred to as the uprising pipe connecting portion 22 and the portion of vacuum degassing vessel 2 connected with the downfalling pipe 4 is referred to as the downfalling pipe connecting portion 23.

The uprising pipe connecting portion 22 and the downfalling pipe connecting portion 23 are portions of narrower breadth in which breadths of flow path $W_2$, $W_3$ (mm) for the molten glass G are narrower than the breadth of molten glass flow path $W_1$ of the wide portion 21. With such structure, the stagnation of molten glass flow, specifically, the stagnation of molten glass flow at an upstream side and at a downstream side of the molten glass flow path is avoidable.

As mentioned before concerning the problems in the vacuum degassing apparatus described in Patent Document 1, when the molten glass flow path of the vacuum degassing vessel in a large-sized vacuum degassing apparatus having a throughput of 200 tons/day or more is narrowed in a local area, various intolerable problems take place.

Namely, when the molten glass flow path of the vacuum degassing vessel is made narrow locally, the flow rate of molten glass flow increases easily in the local area, and the area that such phenomenon occurs becomes easily larger in comparison with the case of the conventional apparatus whereby the problem of erosion in the portion of vacuum degassing vessel in contact with the molten glass may become further serious.

Further, when the molten glass flow path of the vacuum degassing vessel is made narrow locally, an excessive increment of pressure loss takes place in the molten glass flow, which may create a big problem to the vacuum degassing apparatus.

In order to eliminate these problems, the vacuum degassing apparatus of the present invention is so adapted that the positions of the bottoms of molten glass flow path of the uprising pipe connecting portion 22 and downfalling connecting portion 23 are lower than the position of the bottom of molten glass flow path in the wide portion 21. Namely, the uprising pipe connecting portion 22 and the downfalling pipe connecting portion 23 as the portions of narrower breadth have their bottoms of molten glass flow path, the position of which being lower than the bottom of the wide portion 21. With such construction, the differences between the cross-sectional area of molten glass flow path of the wide portion 21 (refer to the definition described later) and the cross-sectional areas of molten glass flow path of the uprising pipe connecting portion 22 and downfalling pipe connecting portion 23 as portions of narrower breadth (refer to the definition described later) become smaller. This means practically that the differences between the cross-sectional area of molten glass flow of the wide portion 21 and the cross-sectional areas of molten glass flow in the uprising pipe connecting portion 22 and downfalling pipe connection portion 23 as portions of narrower breadth are reduced. As a result, in spite of the structure that molten glass flow paths in the uprising pipe connecting portion 22 and the downfalling pipe connecting portion 23 are narrowed locally, an increment of flow rate of the molten glass flow in a local area can be controlled whereby the possibility of corrosion to the portion of vacuum degassing vessel which is brought to contact with the molten glass is lessened. Further, in spite of the construction that the molten glass flow paths in the uprising pipe connecting portion 22 and the downfalling pipe connecting portion 23 are narrowed locally, an excessive increment of pressure loss of the molten glass flow can be controlled.

It is preferable that the position of the bottom of molten glass flow path of the uprising pipe connecting portion 22 and the position of the bottom of molten glass flow path of the downfalling pipe connecting portion 23 are 50 to 1,000 mm lower than the position of the bottom of molten glass flow path of the wide portion 21. Namely, when the depth from the horizontal plane considered to be the liquid plane of molten glass to the bottom of molten glass flow path of the uprising pipe connecting portion 22 (which equals the depth of molten glass flow of the uprising pipe connecting portion 22 when the molten glass G flows in the vacuum degassing vessel 2) is represented as $h_2$, and the depth from the horizontal plane considered to be the liquid plane of molten glass to the bottom of molten glass flow path of the downfalling pipe connecting portion 23 (which equals the depth of molten glass flow of the downfalling pipe connecting portion 23 when the molten glass G flows in the vacuum degassing vessel 2) is represented as $h_3$, it is preferable that values $(h_2-h_1)$ and $(h_3-h_1)$ are respectively in a range of from 50 to 1,000 mm. It is more preferable that differences between these heights are respectively in a range of from 50 to 400 mm, further preferably, in a range of from 50 to 200 mm.

A cross-sectional area can be considered in the molten glass flow path of the vacuum degassing vessel 2 when it is sectioned perpendicular to the flowing direction of molten glass G at an optional point, and such a cross-sectional area means a cross-sectional area in a portion below the horizontal plane considered to be the liquid plane of molten glass. In FIGS. 1 and 2, a cross-sectional area of molten glass flow path in the wide portion 21 is an area represented by $W_1 \times h_1$. When the molten glass G flows in the vacuum degassing vessel 2, such a cross-sectional area equals the cross-sectional area of molten glass flow in the wide portion 21. Similarly, a cross-sectional area of molten glass flow path in the uprising pipe connecting portion 22 is an area represented by $W_2 \times h_2$, and a cross-sectional area of molten glass flow path in the downfalling pipe connecting portion 23 is an area represented by $W_3 \times h_3$.

As described above, in the vacuum degassing apparatus 1 of the present invention, the breadths of molten glass flow path $W_2$, $W_3$ are made narrow in the uprising pipe connecting portion 22 and downfalling pipe connecting portion 23 whereby the stagnation of molten glass flow at an upstream side and a downstream side of the molten glass flow path can be prevented.

Accordingly, it is preferable that in the uprising pipe connecting portion 22 and the downfalling pipe connecting portion 23, differences between the breadths of molten glass flow path $W_2$, $W_3$ and inner diameters $r_2$, $r_3$ of the uprising pipe 3 and downfalling pipe 4 are small. Specifically, it is preferable that the breadth of molten glass flow path $W_2$ of the uprising pipe connecting portion 22 and the inner diameter (the diameter) $r_2$ of the uprising pipe 3 satisfy the relation as indicated in the following formula (1), and the breadth of molten glass flow path $W_3$ of the downfalling pipe connecting portion 23 and the inner diameter (the diameter) $r_3$ of the downfalling pipe 4 satisfy the relation as indicated in the following formula (2):

$$1 \times r_2 \leq W_2 \leq 5 \times r_2 \tag{1}$$

$$1 \times r_3 \leq W_3 \leq 5 \times r_3 \tag{2}$$

where $W_2$ represents the breadth of molten glass flow path of a portion of uprising pipe connecting portion 22 in which the center axis of the uprising pipe 3 extends, and $W_3$ represents the breadth of molten glass flow path of a portion of downfalling pipe connecting portion 23 in which the center axis of the downfalling pipe 4 extends.

When the relations shown in the above-mentioned formulas (1) and (2) are satisfied, the stagnation of molten glass flow doesn't occur at an upstream side or a downstream side of the molten glass flow path because differences between the breadths of molten glass flow paths $W_2$, $W_3$ and the inner diameters $r_2$, $r_3$ of the uprising pipe 3 and downfalling pipe 4 are small.

It is preferable that the breadth of molten glass flow path $W_2$ of the uprising pipe connecting portion 22 and the inner diameter $r_2$ of the uprising pipe 3 satisfy the relation as shown in the following formula (3), more preferably the relation as shown in the following formula (31), and it is preferable that the breadth of molten glass flow path $W_3$ of the downfalling pipe connecting portion 23 and the inner diameter $r_3$ of the downfalling pipe 4 satisfy the relation as shown in the following formula (4), more preferably the relation as shown in the following formula (41):

$$1 \times r_2 \leq W_2 \leq 3 \times r_2 \tag{3}$$

$$1 \times r_3 \leq W_3 \leq 2 \times r_3 \tag{4}$$

$$1.25 \times r_2 \leq W_2 \leq 3 \times r_2 \tag{31}$$

$$1.5 \times r_3 \leq W_3 \leq 2 \times r_3 \tag{41}$$

The determination of the inner diameters $r_2$, $r_3$ of the uprising pipe 3 and downfalling pipe 4 depends on the scale of a vacuum degassing apparatus. In a case of a vacuum degassing apparatus having a throughput of 200 tons/day or more, these inner diameters are generally 100 to 1,000 mm, preferably, 200 to 800 mm, more preferably 300 to 700 mm, further preferably 400 to 600 mm.

Accordingly, the breadth of molten glass flow path $W_2$ of the uprising pipe connecting portion 22 and the breadth of molten glass flow path $W_3$ of the downfalling pipe connecting portion 23 are preferably 100 to 5,000 mm, more preferably 125 to 3,000 mm, further preferably 150 to 2,000 mm, respectively.

In FIG. 2, the shapes in cross section of the uprising pipe 3 and downfalling pipe 4 are circular. However, the cross-sectional shapes of the uprising pipe and downfalling pipe used for the vacuum degassing apparatus are not limited to such shape but they may be an oval shape or a polygonal shape such as a rectangular shape. In such a case, the largest values of inner spans of the uprising pipe 3 and downfalling pipe 4 are indicated as $r_2$ and $r_3$ in the above-mentioned formulas (1) to (4). For example, when the shapes of openings of the uprising pipe 3 and downfalling pipe 4 are an oval shape, their long diameters in the oval shape are indicated as $r_2$, $r_3$ respectively.

As described above, the reason that the positions of the bottoms of molten glass flow path of the uprising pipe connecting portion 22 and downfalling pipe connecting portion 23, as portions of narrow breadth, are lower than the position of the bottom of molten glass flow path of the wide portion 21 in the vacuum degassing apparatus of the present invention is to reduce the differences between the cross-sectional area of molten glass flow path of the wide portion 21 and the cross-sectional areas of molten glass flow path of the uprising pipe connecting portion 22 and downfalling pipe connecting portion 23 as portions of narrow breadth. Accordingly, the position of the bottoms of molten glass flow path of the uprising pipe connecting portion 22 and downfalling pipe connecting portion 23 should not be determined with respect to the position of the bottom of molten glass flow path of the wide portion 21 but these positions should be determined so as to minimize the differences between the cross-sectional area of molten glass flow path of the wide portion 21 and the cross-sectional areas of molten glass flow path of the uprising pipe connecting portion 22 and downfalling pipe connecting portion 23 as portions of narrow breadth, practically, the differences between the cross-sectional area of molten glass flow of the wide portion 21 and the cross-sectional areas of molten glass flow of the uprising pipe connecting portion 22 and downfalling pipe connecting portion 23 as portions of narrow breath. Specifically, it is preferable to determine the depth $h_2$ from the horizontal plane considered to be the liquid plane of molten glass to the bottom of molten glass flow path of the uprising pipe connecting portion 22 so that the cross-sectional area of molten glass flow path $S_1$ in the wide portion 21 and the cross-sectional area of molten glass flow path $S_2$ of the uprising pipe connecting portion 22 satisfy the relation as shown in the following formula (5), and it is preferable to determine the depth $h_3$ from the horizontal plane considered to be the liquid plane of molten glass to the bottom of molten glass flow path of the downfalling pipe connecting portion 23 so that the cross-sectional area of molten glass flow path $S_1$ in the wide portion 21 and the cross-sectional area of molten glass flow path $S_3$ of the downfalling pipe connecting portion 23 satisfy the relation as shown in the following formula (6). As described before, in FIGS. 1 and 2, $S_1$ equals $W_1 \times h_1$, $S_2$ equals $W_2 \times h_2$ and $S_3$ equals $W_3 \times h_3$.

$$1.0 \leq S_1/S_2 \leq 10.0 \quad (5)$$

$$1.0 \leq S_1/S_3 \leq 10.0 \quad (6)$$

It is preferable that $S_1$ and $S_2$ satisfy the relation as indicated in the following formula (7), and it is more preferable that they satisfy the relation as indicated in the following formula (8):

$$1.0 \leq S_1/S_2 \leq 5.0 \quad (7)$$

$$1.0 \leq S_1/S_2 \leq 3.0 \quad (8)$$

It is further preferable that $S_1$ and $S_3$ satisfy the relation as indicated in the following formula (9) and is particularly preferable to satisfy the relation as indicated in the following formula (10):

$$1.0 \leq S_1/S_3 \leq 5.0 \quad (9)$$

$$1.0 \leq S_1/S_3 \leq 3.0 \quad (10)$$

As described above, in the vacuum degassing apparatus 1 of the present invention, the wide portion 21 is provided in the vacuum degassing vessel 2 to attain a throughput of 200 tons/day or more without causing problems such as the breakage of the molten glass flow path owing to an increment of thermal expansion in its longitudinal direction, an excessive increase of pressure loss in the molten glass flow and so on. Accordingly, in the relations between the length of molten glass flow path $L_1$ of the wide portion 21 and the lengths of molten glass flow path $L_2$ and $L_3$ of the uprising pipe connecting portion 22 and downfalling pipe connecting portion 23 as portions of narrow breadth, it is preferable that they satisfy the relations as indicated in the following formulas (11) and (12):

$$0.5 \times W_1 \leq L_2 \leq 2 \times L_1 \quad (11)$$

$$0.5 \times W_1 \leq L_3 \leq 2 \times L_1 \quad (12)$$

In the above-mentioned formulas (11) and (12), $L_2$ or $L_3$ does not represent the length of molten glass flow path of a portion that the breadth of molten glass flow path is less than $W_2$ or $W_3$ as defined before, but it represents the length of molten glass flow path of the entire portion having a breadth smaller than the breadth of molten glass flow path $W_1$ of the wide portion 21.

In the following formulas (11) and (12), the reason that $L_2$ and $L_3$ are preferably at least 0.5 times of the breadth of molten glass flow path $W_1$ in the wide portion 21 is as follows. If $L_2$ or $L_3$ is less than 0.5 times of $W_1$, a large difference in breadth of molten glass flow path is produced between the wide portion 21 and the uprising pipe connecting portion 22 or the downfalling pipe connecting portion 23 whereby an excessive increase of pressure loss is produced in the molten glass flow.

It is more preferable that $L_1$ and $L_2$ satisfy the relation as indicated in the following formula (13) and is further preferable that they satisfy the relation as indicated in the following formula (14):

$$0.6 \times W_1 \leq L_2 \leq 1.5 \times L_1 \quad (13)$$

$$0.75 \times W_1 \leq L_2 \leq 1 \times L_1 \quad (14)$$

It is more preferable that $L_1$ and $L_3$ satisfy the relation as indicated in the following formula (15) and is further preferable that they satisfy the relation as indicated in the following formula (16):

$$0.6 \times W_1 \leq L_3 \leq 1.5 \times L_1 \quad (15)$$

$$0.75 \times W_1 \leq L_3 \leq 1 \times L_1 \quad (16)$$

Figure 3:
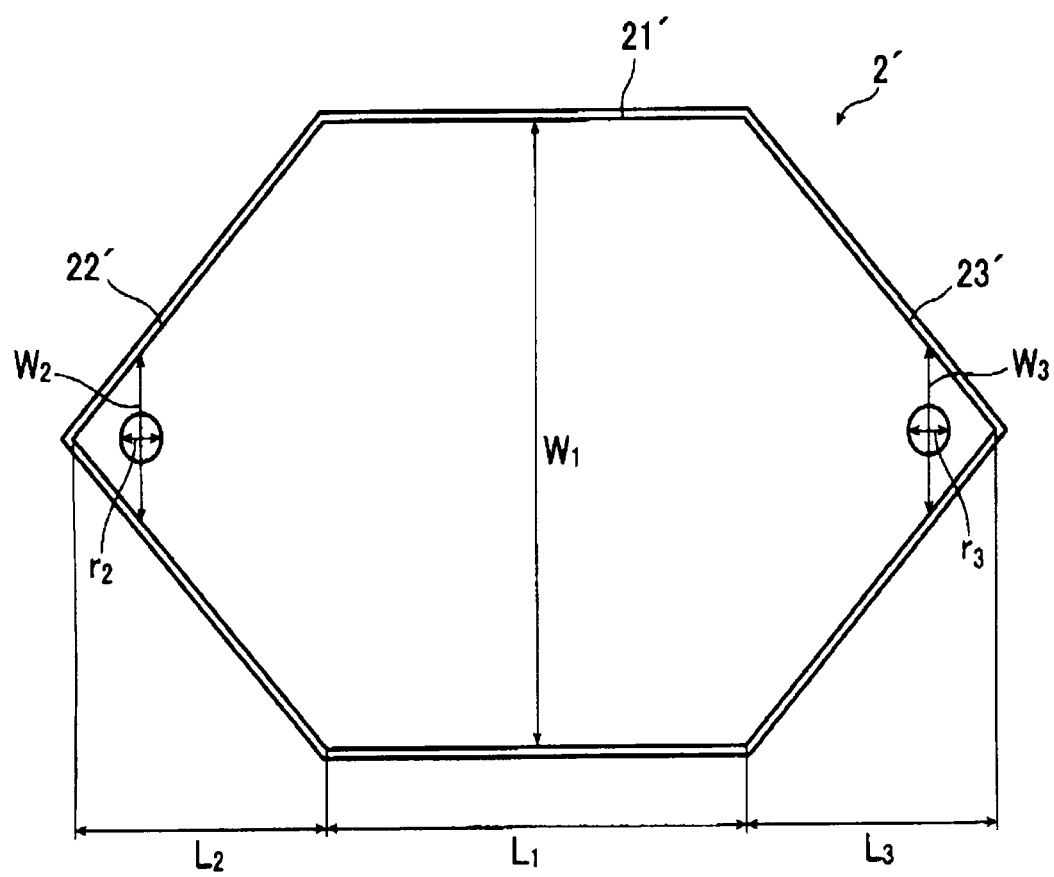
FIG. 3 is a plan view showing another embodiment of the vacuum degassing vessel in the vacuum degassing apparatus of the present invention. The shape of the vacuum degassing vessel in a plan view is different from that shown in FIG. 2.

In the uprising pipe connecting portion 22 or the downfalling pipe connecting portion 23 in the vacuum degassing vessel shown in FIG. 2, the breadth of molten glass flow path of a portion in the vicinity of the opening of the uprising pipe 3 or the downfalling pipe 4 is constant. However, in the vacuum degassing apparatus of the present invention, it is not always necessary that the uprising pipe connecting portion or the downfalling pipe connecting portion as a portion of narrow breadth has a portion having a constant breadth of molten glass flow path. FIG. 3 is a plan view showing another embodiment of vacuum degassing vessel of the vacuum degassing apparatus of the present invention. FIG. 3 shows a vacuum degassing vessel 2' in which an uprising pipe connecting portion 22' or a downfalling pipe connecting portion 23' as a portion of narrow breadth does not have a constant breadth of molten glass flow path. The cross-sectional shape of the vacuum degassing vessel 2' shown in FIG. 3 is the same as that of the vacuum degassing vessel 2 shown in FIG. 1.

In the vacuum degassing vessel 2' shown in FIG. 3, although it does not have an uprising pipe connecting portion 22' or a downfalling pipe connecting portion 23', as a portion of narrow breadth, having a constant breadth of molten glass flow path, it preferably satisfies the conditions described with respect to the vacuum degassing vessel 2 shown in FIG. 2.

In the vacuum degassing apparatus of the present invention, constituent materials for the vacuum degassing vessel, the uprising pipe and the downfalling pipe are not in particular limited as long as a material having excellent heat resisting properties and excellent anticorrosive properties to molten glass, is used. Accordingly, platinum or a platinum alloy such as platinum-rhodium alloy may be used. However, since the vacuum degassing apparatus of the present invention is a large-sized vacuum degassing apparatus having a throughput of 200 tons/day or more, it is preferable to use a fire resistant brick such as fused refractory. Further, since the vacuum degassing vessel of the present invention has a wide portion, it is necessary to fabricate it by assembling a plurality of fire resistant bricks in a breadth direction of the molten glass flow path in the same manner as the vacuum degassing vessel described in Patent Document 1, and when the vacuum degassing vessel is constructed by assembling a plurality of fire resistant bricks, it is preferable to construct it by the same procedure as the vacuum degassing vessel described in Patent Document 1. Namely, a side wall of the vacuum degassing vessel is constructed by piling up some monolithic fire resistant bricks, each without having any joint in a direction of height of the vacuum degassing vessel, in a longitudinal direction of the vessel. The ceiling and the bottom of the vacuum degassing vessel are constructed by arranging a plurality of fire resistant bricks in a breadth direction as well as a longitudinal direction. Fire resistant bricks for constituting the ceiling and the bottom have notches at portions to be connected with the fire resistant bricks for a side wall, and it is preferable that the fire resistant bricks for the side wall is assembled from the outer side to those for the ceiling or the bottom at these notches. Further, it is preferable to tighten the fire resistant bricks for side walls from their outer sides with a fixing means such as a jack so as not to produce an opening in the joints at connecting portions between the fire resistant bricks for the side walls and the fire resistant bricks for the ceiling or the fire resistant bricks for the bottom. Further, with respect to the longitudinal direction, as shown in FIG. 1 of Patent Document 1, it is preferable to tighten the fire resistant bricks for a front wall and the fire resistant bricks for a rear wall for the vacuum degassing vessel from their outer sides with a fixing means such as a jack so as not to produce an opening in the joints at connecting portions between the fire resistant bricks for the front wall or the fire resistant bricks for the rear wall and the fire resistant bricks for the ceiling or the fire resistant bricks for the bottom, due to thermal expansion. The ceiling of vacuum degassing vessel constructed by assembling a plurality of fire resistant bricks in a breadth direction should have an abutment structure wherein the breadth portion of one or more fire resistant bricks located at the center comes out upward, whereby the fire resistant bricks constituting the ceiling can be prevented from dropping.

With the vacuum degassing apparatus having the above-mentioned construction according to the present invention, a throughput of 200 tons/day or more, preferably 500 tons/day or more, more preferably 700 tons/day or more can be attained without causing problems such as the stagnation of molten glass flow in the molten glass flow path, an increment of flow rate of the molten glass flow in a local area, an excessive increment of pressure loss in the molten glass flow and so on.

When degassing is carried out using the vacuum degassing apparatus of the present invention, molten glass is supplied to the vacuum degassing vessel while the interior of the vacuum degassing vessel is maintained in a predetermined depressurized state. The interior of the vacuum degassing vessel is preferably depressurized to be 51 to 613 hPa (38 to 460 mmHg), more preferably, the interior is depressurized to be 80 to 338 hPa (60 to 253 mmHg).

With respect to the glass to be degassed by the vacuum degassing apparatus of the present invention, there is no restriction in terms of composition as long as it is produced by a melting method. Accordingly, soda-lime silica glass represented by soda-lime glass or alkali glass such as alkali-borosilicate glass may be employed.

Soda-lime glass usable for a flat glass for buildings or vehicles preferably has a composition which comprises $SiO_2$: 65-75%, $Al_2O_3$: 0-3%, CaO: 5-15%, MgO: 0-15%, $Na_2O$: 10-20%, $K_2O$: 0-3%, $Li_2O$: 0-5%, $Fe_2O_3$: 0-3%, $TiO_2$: 0-5%, $CeO_2$: 0-3%, BaO: 0-5%, SrO: 0-5%, $B_2O_3$: 0-5%, ZnO: 0-5%, $ZrO_2$: 0-5%, $SnO_2$: 0-3% and $SO_3$: 0-0.5%, as represented by mass percentage based on oxides.

Non-alkali glass usable for a board for liquid crystal display preferably has a composition which comprises $SiO_2$: 39-70%, $Al_2O_3$: 3-25%, $B_2O$: 1-20%, MgO: 0-10%, CaO: 0-17%, SrO: 0-20% and BaO: 0-30%, as represented by mass percentage based on oxides.

The mixed alkali type glass usable for a board for plasma display preferably has a composition which comprises $SiO_2$: 50-75%, $Al_2O_3$: 0-15%, MgO+CaO+SrO+BaO+ZnO: 6-24% and $Na_2O+K_2O$: 6-24%, as represented by mass percentage based on oxides.

The apparatus for producing glass products according to the present invention comprises the vacuum degassing apparatus as described above, a melting means provided at an upstream side of the vacuum degassing apparatus to melt glass materials into molten glass, a shaping means provided at a downstream side of the vacuum degassing apparatus to shape the molten glass and an annealing means for annealing a shaped glass product. The melting means, the shaping means and the annealing means may be ones belonging to known art. In the melting means, for example, a glass material formulated to have a desired composition is put into the melting tank and it is heated to a predetermined temperature according to kinds of glass, e.g., about 1,400 to 1,600° C. in a case of soda-lime glass for buildings, vehicles and so on to obtain molten glass. For the shaping means, an apparatus employing a float method, a fusion method or a down-draw method may be mentioned, for example. Among these, the shaping means employing a float bath for the float method is preferred since it can produce in large scale a flat glass of high quality having a wide range of thickness from thin sheet glass to thick sheet glass. As the annealing means, an annealing furnace is generally employed, which is provided with conveyer rollers as a conveying mechanism for the shaped glass and a mechanism for decreasing gradually the temperature of the shaped glass, for example. The mechanism for decreasing gradually the temperature utilizes combustion gas or an electric heater which can control an amount of heat to feed to necessary positions in the furnace whereby the shaped glass is gradually cooled (annealed). Thus, the residual stress existing in the shaped glass can be eliminated.

In the following, description will be made as to a process for producing glass products according to the present invention.

Figure 4:
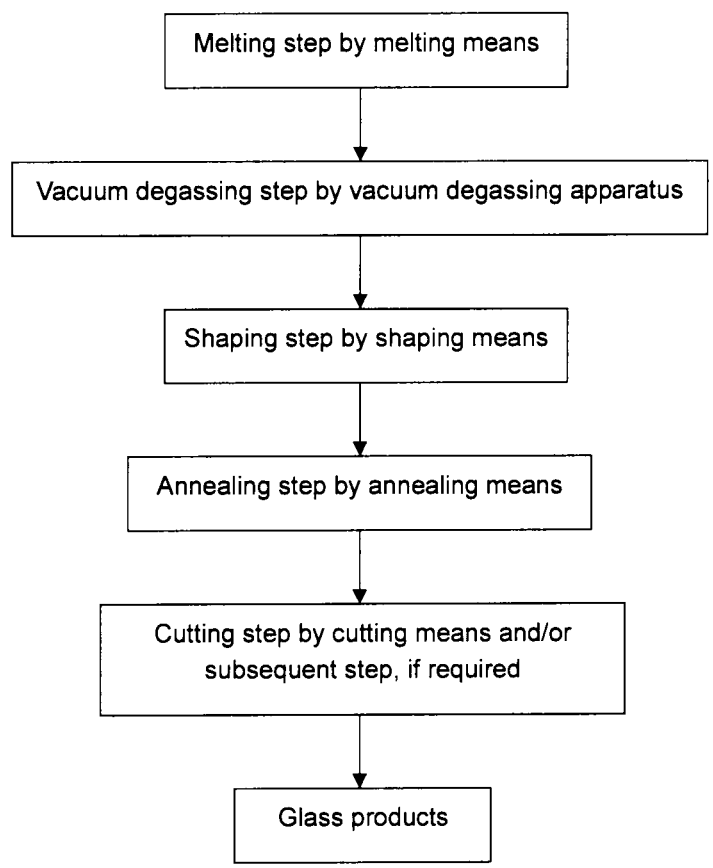
FIG. 4 is a flowchart of an embodiment of the method for producing glass products according to the present invention.

FIG. 4 is a flowchart of an embodiment of process for producing glass products according to the present invention. This process is characterized by employing the above-mentioned vacuum degassing apparatus of the present invention. The process for producing glass products of the present invention comprises a step of degassing molten glass by the vacuum degassing apparatus as described before, a melting step of melting glass materials at an upstream side of the vacuum degassing apparatus to produce molten glass, a shaping step of shaping the molten glass at a downstream side of the vacuum degassing apparatus and an annealing step of annealing a shaped glass product. Further, according to the present invention, there is provided a process for producing glass products including a melting step of melting glass materials to produce molten glass, a step of degassing the molten glass by a vacuum degassing apparatus having a vacuum degassing vessel, and an uprising pipe and a downfalling pipe which are connected with the vacuum degassing vessel, a shaping step of shaping the molten glass after the degassing treatment and an annealing step of annealing a shaped glass product, the process for producing glass products being characterized in that the molten glass flowing in the vacuum degassing vessel has a wide portion wherein the proportion $w_1/l_1$ of the breadth of molten glass flow $w_1$ to the length of molten glass flow $l_1$ is preferably at least 0.2 and is preferably at most 4, and that in the vacuum degassing vessel, the breadth of molten glass flow $w_2$ of the portion connected with the uprising pipe, and the breadth of molten glass flow $w_3$ of the portion connected with the downfalling pipe are narrower than the breadth of molten glass flow $w_1$ in the wide portion and the depth of molten glass flow $h_2$ in the portion connected with the uprising pipe, and the depth of molten glass flow $h_3$ in the portion connected with the downfalling pipe are deeper than the depth of molten glass flow $h_1$ in the wide portion. The above-mentioned $w_1$, $w_2$, $w_3$ and $l_1$ are respectively the same as $W_1$, $W_2$, $W_3$ and $L_1$ in the molten glass flow path. Further, as described above, the depth of the molten glass flow $h_1$ in the wide portion equals the depth from the horizontal plane considered to be the liquid plane of molten glass to the bottom of molten glass flow path in the wide portion; the depth of the molten glass flow $h_2$ in the portion connected with the uprising pipe equals the depth from the horizontal plane considered to be the liquid plane of molten glass to the bottom of molten glass flow path in the portion connected with the uprising pipe, and the depth of molten glass flow $h_3$ in the portion connected with the downfalling pipe equals the depth from the horizontal plane considered to be the liquid plane of molten glass to the bottom of molten glass flow path in the portion connected with the downfalling pipe.

In the process for producing glass products according to the present invention, techniques other than employing the vacuum degassing apparatus of the present invention belong to known art. The apparatuses employed in the process for producing glass products according to the present invention have already been described before. FIG. 4 shows a cutting step and a subsequent step employed, if required, in addition to the melting step, the shaping step and the annealing step which are constituent elements of the process for producing glass products according to the present invention.

Industrial Applicability

The vacuum degassing apparatus, the apparatus for producing glass products and the process for producing glass products according to the present invention can be employed for producing glass products for buildings, vehicles, optical devices, medical devices and other wide applications.

The entire disclosure of Japanese Patent Application No. 2008-144519 filed on Jun. 2, 2008 including specification, claims, drawings and summary is incorporated herein by reference in its entirety.

EXPLANATION OF NUMERICAL REFERENCE

1: Vacuum degassing apparatus
2, 2': Vacuum degassing vessel
21, 21': Wide portion
22, 22': Uprising pipe connecting portion
23, 23': Downfalling pipe connecting portion
3: Uprising pipe
4: Downfalling pipe
10: Upstream-side conduit structure
20: Downstream-side conduit structure

What is claimed is:

1. A vacuum degassing apparatus comprising:
a vacuum degassing vessel providing a molten glass flow path of a molten glass, the molten glass flow path having a first portion, a wide portion and a second portion;
an uprising pipe connected with the vacuum degassing vessel in the first portion; and
a downfalling pipe connected with the vacuum degassing vessel in the second portion,
wherein the vacuum degassing vessel provides the molten glass flow path having a breadth $W_1$ and a length $L_1$ in the wide portion, which satisfy that a proportion $W_1/L_1$ is at least 0.2,
the first portion has a breadth $W_2$ in a portion connected with the uprising pipe, the second portion has a breadth $W_3$ in a portion connected with the downfalling pipe, the breadth $W_2$ and the breadth $W_3$ are narrower than the breadth $W_1$ in the wide portion,
the vacuum degassing vessel is configured such that a position of a bottom of the molten glass flow path in the portion connected with the uprising pipe and a position of a bottom of the molten glass flow path in the portion connected with the downfalling pipe are lower than a position of a bottom of the molten glass flow path in the wide portion,
the breadth $W_1$ in the wide portion is at least 1,000 mm, and the vacuum degassing apparatus provides a throughput of 200 tons/day or more.

2. The vacuum degassing apparatus according to claim 1, wherein the breadth $W_1$ in the wide portion is at most 10,000 mm.

3. The vacuum degassing apparatus according to claim 1, wherein the length $L_1$ in the wide portion is at least 5,000 mm.

4. The vacuum degassing apparatus according to claim 1, wherein the position of the bottom of the molten glass flow path in the portion connected with the uprising pipe and the position of the bottom of the molten glass flow path in the portion connected with the downfalling pipe are 50 to 1,000 mm lower than the position of the bottom of the molten glass flow path in the wide portion.

5. The vacuum degassing apparatus according to claim 1, wherein the uprising pipe has an inner diameter $r_2$, the downfalling pipe has an inner diameter $r_3$, and the breadth $W_2$ in the portion connected with the uprising pipe, the breadth $W_3$ in the portion connected with the downfalling pipe, the inner diameter $r_2$ of the uprising pipe and the inner diameter $r_3$ of the downfalling pipe satisfy:

$1 \times r_2 \leq W_2 \leq 5 \times r_2$ and $1 \times r_3 \leq W_3 \leq 5 \times r_3$.

6. The vacuum degassing apparatus according to claim 1, wherein the vacuum degassing vessel is configured such that the molten glass forms a horizontal plane of a liquid plane, and the vacuum degassing vessel provides the molten glass flow having a cross-sectional area $S_1$ in the wide portion under the horizontal plane, a cross-sectional area $S_2$ in the portion connected with the uprising pipe under the horizontal plane and a cross-sectional area $S_3$ in the portion connected with the downfalling pipe under the horizontal plane which satisfy:

$1.0 \leq S_1/S_2 \leq 10.0$ and $1.0 \leq S_1/S_3 \leq 10.0$.

7. The vacuum degassing apparatus according to claim 1, wherein the molten glass flow path has a length $L_2$ in the first portion and a length $L_3$ in the second portion, and the breadth $W_1$ in the wide portion, the length $L_1$ in the wide portion, the length $L_2$ in the first portion and the length $L_3$ in the second portion satisfy:

$0.5 \times W_1 \leq L_2 \leq 2 \times L_1$ and $0.5 \times W_1 \leq L_3 \leq 2 \times L_1$.

8. An apparatus for producing glass products, which comprises:
the vacuum degassing apparatus of claim 1;
a melting device provided at an upstream side of the vacuum degassing apparatus and configured to melt a glass material into molten glass;
a shaping device provided at a downstream side of the vacuum degassing apparatus and configured to shape the molten glass; and
an annealing device configured to anneal a shaped glass product.

9. The vacuum degassing apparatus according to claim 1, wherein the proportion $W_1/L_1$ is at least 0.25.

10. The vacuum degassing apparatus according to claim 1, wherein the proportion $W_1/L_1$ is at least 0.3.

11. The vacuum degassing apparatus according to claim 1, wherein the proportion $W_1/L_1$ is at most 4.

12. The vacuum degassing apparatus according to claim 1, wherein the proportion $W_1/L_1$ is at most 2.5.

13. The vacuum degassing apparatus according to claim 1, wherein the proportion $W_1/L_1$ is at least 0.35 and at most 1.3.

14. The vacuum degassing apparatus according to claim 1, wherein the vacuum degassing vessel has a ceiling covering the molten glass flow path, and a largest height $H_1$ from a bottom to the ceiling of the wide portion is from 500 to 5,000 mm.

15. The vacuum degassing apparatus according to claim 14, wherein the largest height $H_1$ is from 700 to 1,500 mm.

16. The vacuum degassing apparatus according to claim 1, wherein the vacuum degassing vessel has a first slanted bottom portion which connects the bottom of the molten glass flow path in the portion connected with the uprising pipe and the bottom of the molten glass flow path in the wide portion, and the first slanted bottom portion is provided such that the position of the bottom of the molten glass flow path in the portion connected with the uprising pipe is lower than the position of the bottom of the molten glass flow path in the wide portion.

17. The vacuum degassing apparatus according to claim 16, wherein the vacuum degassing vessel has a second slanted bottom portion which connects the bottom of the molten glass flow path in the portion connected with the downfalling pipe and the bottom of the molten glass flow path in the wide portion, and the second slanted bottom portion is provided such that the position of the bottom of the molten glass flow path in the portion connected with the downfalling pipe is lower than the position of the bottom of the molten glass flow path in the wide portion.

18. The vacuum degassing apparatus according to claim 1, wherein a height of the wide portion of the vacuum degassing vessel $H_1$ is from 500-5,000 mm, the depth $h_1$ from a horizontal plane considered to be the liquid plane of molten glass to the bottom of the wide portion is 100 to 1,000 mm, and a value $H_1 - h_1$ is at least 100 mm.

19. A vacuum degassing apparatus comprising:
a vacuum degassing vessel providing a molten glass flow path of a molten glass, the molten glass flow path having a first portion, a wide portion and a second portion;
an uprising pipe connected with the vacuum degassing vessel in the first portion; and
a downfalling pipe connected with the vacuum degassing vessel in the second portion,
wherein the vacuum degassing vessel provides the molten glass flow path having a breadth $W_1$ and a length $L_1$ in the wide portion, which satisfy that a proportion $W_1/L_1$ is at least 0.2,
the first portion has a breadth $W_2$ in a portion connected with the uprising pipe, the second portion has a breadth $W_3$ in a portion connected with the downfalling pipe, the breadth $W_2$, and the breadth $W_3$ are narrower than the breadth $W_1$ in the wide portion,
the vacuum degassing vessel is configured such that a position of a bottom of the molten glass flow path in the portion connected with the uprising pipe and a position of a bottom of the molten glass flow path in the portion connected with the downfalling pipe are lower than a position of a bottom of the molten glass flow path in the wide portion,
the breadth $W_1$ in the wide portion is at least 1,000 mm, and the vacuum degassing apparatus provides a throughput of 200 tons/day or more,
wherein the vacuum degassing vessel is configured such that the first portion does not have a constant breadth of the molten glass flow path, and that the second portion does not have a constant breadth of the molten glass flow path.

20. A process for producing glass products which comprises:
degassing molten glass by a vacuum degassing apparatus;
melting a glass material at an upstream side of the vacuum degassing apparatus to produce molten glass;
shaping the molten glass at a downstream side of the vacuum degassing apparatus; and
annealing a shaped glass product, wherein the vacuum degassing apparatus comprises:
a vacuum degassing vessel providing a molten glass flow path of a molten glass, the molten glass flow path having a first portion, a wide portion and a second portion;
an uprising pipe connected with the vacuum degassing vessel in the first portion; and
a downfalling pipe connected with the vacuum degassing vessel in the second portion, wherein the vacuum degassing vessel provides the molten glass flow path having a breadth $W_1$ and a length $L_1$ in the wide portion which satisfy that a proportion $W_1/L_1$ is at least 0.2,
the first portion has a breadth $W_2$ in a portion connected with the uprising pipe, the second portion has a breadth $W_3$ in a portion connected with the downfallen pipe, the breadth $W_2$ and the breadth $W_3$ are narrower than the breadth $W_1$ in the wide portion,
the vacuum degassing vessel is configured such that a position of a bottom of the molten glass flow path in the portion connected with the uprising pipe and a position of a bottom of the molten glass flow path in the portion connected with the downfalling pipe are lower than a position of a bottom of the molten glass flow path in the wide portion,
the breadth $W_1$ in the wide portion is at least 1,000 mm and the vacuum degassing apparatus provides a throughput of 200 tons/day or more.

21. A process for producing glass products, comprising:
melting a glass material to produce molten glass;
degassing the molten glass by a vacuum degassing apparatus comprising a vacuum degassing vessel, an uprising pipe, and a downfalling pipe, the degassing of the molten glass comprising forming a molten glass flow in the vacuum degassing vessel;
shaping the molten glass after the degassing; and
annealing a shaped glass product,
wherein the molten glass flow is formed such that the molten glass flow has a first portion, a wide portion, and a second portion in the vacuum degassing vessel, the first portion includes a portion where the molten glass is supplied from the uprising pipe to the vacuum degassing vessel, the second portion includes a portion where the molten glass is discharged from the vacuum degassing vessel through the downfalling pipe, the molten glass flow is formed such that the wide portion has a breadth $W_1$ and a length $L_1$ satisfying that a proportion $W_1/L_1$ is at least 0.2,
the breadth $W_1$ in the wide portion is at least 1,000 mm and the vacuum degassing apparatus provides a throughput of 200 tons/day or more,
the molten glass flow has a breadth $W_2$ in the portion where the molten glass is supplied from the uprising pipe and a breadth $W_3$ in the portion where the molten glass is discharged from the downfalling pipe, the breadth $W_2$ and the breadth $W_3$ are narrower than the breadth $W_1$ in the wide portion,
the molten glass flow has a depth $h_1$ in the wide portion, a depth $h_2$ in the portion where the molten glass is supplied from the uprising pipe and a depth $h_3$ in the portion where the molten glass is discharged from the downfalling pipe, and the depth $h_2$ and the depth $h_3$ are deeper than the depth $h_1$ in the wide portion.

* * * * *